Dec. 29, 1925.                                                 1,567,750
W. PROFITLICH
PISTON FOR HIGH PRESSURE COMPRESSORS AND THE LIKE
Filed August 22, 1924
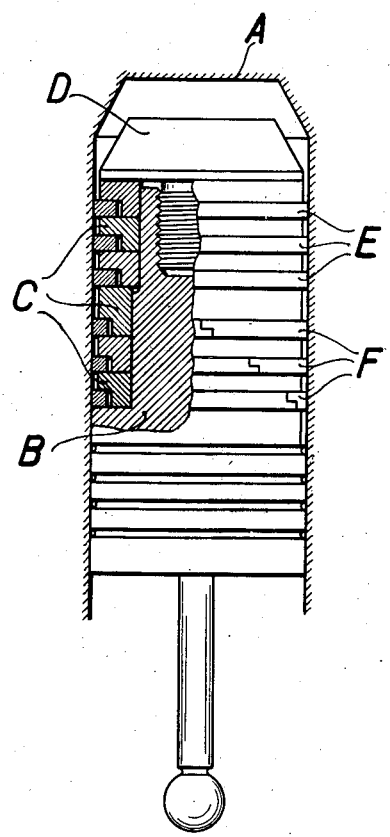

Patented Dec. 29, 1925.

1,567,750

UNITED STATES PATENT OFFICE.

WILHELM PROFITLICH, OF KIEL, GERMANY, ASSIGNOR TO FRIED. KRUPP GERMANIA-WERFT AKTIENGESELLSCHAFT, OF KIEL-GAARDEN, GERMANY.

PISTON FOR HIGH-PRESSURE COMPRESSORS AND THE LIKE.

Application filed August 22, 1924. Serial No. 733,633.

*To all whom it may concern:*

Be it known that I, WILHELM PROFITLICH, residing at Kiel, Germany, a citizen of the German Republic, have invented a certain new and useful Improvement in Pistons for High-Pressure Compressors and the like, of which the following is a specification.

It has been found that the working faces of the cylinder and, more particularly, the guide faces of the piston rings of high-pressure compressors are subjected to an abnormally high wear. This phenomenon is based on the fact that the highly compressed air enters behind the piston rings and presses the same at an unnecessarily strong pressure against the working face of the cylinder. The leakage of the compressed air takes place at the joints (locks) of the ordinary elastic piston rings as well as at the entire circumference of the rings. The last-said leakage is facilitated inasmuch as the rings have to be made of a comparatively small thickness in radial direction for giving them the required resiliency; therefore the head surfaces of the rings bear against the piston body only by narrow annular faces and the width of these bearing faces becomes even more unfavorable during the springing and radial shifting of the ring. In addition thereto, the said annular faces will wear out rapidly because they are so small, and in consequence thereof there will gradually be produced at both sides of the piston ring a clearance which in turn will render the leakage of the compressed air the more easy. Now, the invention has for its object to provide a piston for high-pressure compressors and the like which does no longer possess the said drawback of a too rapid wear of the contacting surfaces of the piston rings and cylinder, this object being essentially attained by arranging ahead of the ordinary divided elastic piston rings towards the compression space a plurality of undivided piston rings.

The accompanying drawing illustrates, as an embodiment of the subject-matter of the invention, an elevation, partly in section, of a piston constructed in accordance with the invention for a high-pressure compressor.

A designates the diagrammatically indicated cylinder and B the piston of a high-pressure compressor. The piston body B has slipped onto its upper portion which is offset in a step-like manner, rings C of angular cross-section, and inserted between each two of these rings C is a piston ring E or F, respectively. The whole system of rings C, E, F is held in position by a mushroom-shaped head member D which is screwed into the piston body B. The rings F are ordinary elastic piston rings, while the rings E which lie ahead of the rings F, are solid rings which are thicker in radial direction than the rings F and have a radial play in the piston body.

The arrangement of the undivided piston rings E ahead of the divided elastic rings F secures the following advantages:

First, the rings E have no joint which usually facilitates most the entering of the compressed air behind the piston rings. Besides, as the rings need not be resilient their thickness in radial direction may be made so large as to provide for sufficiently large packing faces between the head faces of the rings and the piston body, whereby at the same time the wear of those head faces is reduced to a harmless amount. Finally, the solid construction of the piston rings E prevents the same from being too strongly pressed against the working surface of the cylinder and, consequently, a too heavy wear of the guide faces is avoided even if some compressed air would enter behind the piston rings E. As a matter of course, the piston rings E must be particularly well fitted and ground in the cylinder. During the working, the solid rings E the wear of which is kept within normal limits for the above-stated reasons, act like a labyrinth packing as a protection for the ordinary elastic piston rings F which are now under a compressed air pressure which is considerably smaller than the full pressure of compression. Therefore, even if compressed air should enter behind the elastic rings, they will be pressed less strongly against the working surface of the cylinder so that they are likewise submitted only to a reduced wear.

The use of the described piston construction will be recommendable in all cases where the piston has to work against high pressures, such as for instance also in high-pressure combustion engines, high-pressure piston steam engines and the like.

The number of the solid rings to be used depends on the amount of the final compression pressure.

Claims.

1. In a piston for high-pressure compressors or the like, a divided elastic piston ring, and a plurality of spaced, undivided piston rings in advance of said divided ring and forming a labyrinthine packing for protecting the latter.

2. A piston of the kind stated, comprising divided elastic piston rings and undivided piston rings arranged ahead of and being thicker in radial direction than the divided elastic rings.

The foregoing specification signed at Hamburg, Germany, this 29th day of July, 1924.

WILHELM PROFITLICH.